(12) United States Patent
Wang et al.

(10) Patent No.: US 11,166,338 B2
(45) Date of Patent: Nov. 2, 2021

(54) INTELLIGENT DISASTER PREVENTION SYSTEM AND INTELLIGENT DISASTER PREVENTION METHOD

(71) Applicant: Osense Technology Co., Ltd., Taipei (TW)

(72) Inventors: You-Kwang Wang, Taipei (TW); Chao-Chuan Lu, Taipei (TW)

(73) Assignee: Osense Technology Co., Ltd., Taipei (TW)

( * ) Notice: Subject to any disclaimer, the term of this patent is extended or adjusted under 35 U.S.C. 154(b) by 0 days.

(21) Appl. No.: 16/809,557

(22) Filed: Mar. 5, 2020

(65) Prior Publication Data

US 2020/0288532 A1 Sep. 10, 2020

Related U.S. Application Data

(60) Provisional application No. 62/813,763, filed on Mar. 5, 2019.

(51) Int. Cl.
*H04W 76/50* (2018.01)
*G06K 9/00* (2006.01)
(Continued)

(52) U.S. Cl.
CPC ........ *H04W 76/50* (2018.02); *G06F 16/2329* (2019.01); *G06F 16/5866* (2019.01);
(Continued)

(58) Field of Classification Search
CPC ....... H04W 76/50; H04W 4/024; H04W 4/90; H04W 4/50; H04W 4/70; H04W 4/80;
(Continued)

(56) References Cited

U.S. PATENT DOCUMENTS 8,204,836 B2   6/2012 Balaban et al.
8,886,930 B1 * 11/2014 Thornewell et al. ......... 713/162
(Continued)

FOREIGN PATENT DOCUMENTS

CN    103020744    4/2013
CN    108922188    11/2018
(Continued)

OTHER PUBLICATIONS

"Office Action of Japan Counterpart Application", dated Apr. 13, 2021, p. 1-p. 3.
(Continued)

*Primary Examiner* — Meless N Zewdu
(74) *Attorney, Agent, or Firm* — JCIPRNET

(57) ABSTRACT

An intelligent disaster prevention system and an intelligent disaster prevention method are provided. The intelligent disaster prevention system includes a server and an electronic device coupled to the server. The server detects the electronic device in a disaster area and obtains a location information of the electronic device. The server obtains real-time disaster information from a website. The server obtains a real-time aerial image corresponding to the disaster area. The server selects a first refuge from a plurality of refuges corresponding to the disaster area according to the location information, the real-time disaster information, and the real-time aerial image, and calculates an evacuation route from the location information to the first refuge. The electronic device receives the first refuge and the evacuation route, and displays the first refuge and the evacuation route on a map.

18 Claims, 3 Drawing Sheets

(51) Int. Cl.
*G06F 16/9538* (2019.01)
*G06T 19/00* (2011.01)
*G06F 16/23* (2019.01)
*H04W 4/024* (2018.01)
*H04W 4/90* (2018.01)
*G06F 16/58* (2019.01)

(52) U.S. Cl.
CPC ....... *G06F 16/9538* (2019.01); *G06K 9/0063* (2013.01); *G06T 19/006* (2013.01); *H04W 4/024* (2018.02); *H04W 4/90* (2018.02)

(58) Field of Classification Search
CPC ..... H04W 88/00; H04W 88/02; H04W 88/08; H04W 88/18; H04W 92/10; H04W 92/18; H04W 92/08; H04W 4/02; H04W 4/025; H04W 4/026; H04W 4/027; H04W 4/029; H04W 4/021; H04W 4/06; H04W 4/14; H04W 4/18; H04W 12/64; H04W 48/00; H04W 48/02; H04W 48/04; H04W 48/06; H04W 48/08; H04W 48/10; H04W 48/14; H04W 64/00; H04W 64/006; H04W 68/00; H04W 68/02; H04W 68/10; H04W 76/40; H04W 76/20; G06K 9/00; G06K 9/0063; G06K 9/00013; G06K 9/00026; G06K 9/00208; G06K 9/20; G06F 16/00; G06F 16/387; G06F 16/487; G06F 16/587; G06F 16/60; G06F 16/70; G06F 16/687; G06F 3/1269; G06F 9/542; G06F 16/58; G06F 16/23; G06F 16/9538; G06F 16/2329; G06F 16/5866; G06F 16/9537; G06F 16/29; G06F 16/25; G06T 19/003; G06T 19/00; G06T 19/20; G06T 19/006; G06T 15/00; G06T 15/205; G06T 2211/428; G06T 7/80; G06Q 10/047; G06Q 50/265; G06Q 50/26; G06Q 90/205

See application file for complete search history.

(56) References Cited

U.S. PATENT DOCUMENTS

| | | | |
|---|---|---|---|
| 2008/0208962 A1 | 8/2008 | Kim et al. | |
| 2010/0328093 A1* | 12/2010 | Robinson et al. | 340/825.49 |
| 2011/0141141 A1* | 6/2011 | Kankainen | 345/632 |
| 2012/0047187 A1* | 2/2012 | Daus | 707/805 |
| 2017/0059343 A1* | 3/2017 | Spinelli et al. | |
| 2018/0075605 A1* | 3/2018 | Jia et al. | G06T 7/11 |
| 2018/0228448 A1* | 8/2018 | Miyazawa et al. | A61B 5/747 |
| 2019/0156404 A1* | 5/2019 | Gabriele et al. | G06Q 30/0643 |
| 2019/0230466 A1* | 7/2019 | Merjanian et al. | H04W 4/023 |
| 2019/0391575 A1* | 12/2019 | Hortner | G05D 1/0027 |
| 2020/0175767 A1* | 6/2020 | Stivi et al. | G06T 19/006 |

FOREIGN PATENT DOCUMENTS

| | | | |
|---|---|---|---|
| JP | 2015195030 | 11/2015 | |
| JP | 2015224981 | 12/2015 | |
| TW | I466052 | 12/2014 | |
| TW | I567697 | 1/2017 | |
| TW | 201706569 | 2/2017 | |
| WO | WO 2018236016 A1 * | 12/2018 | G08B 25/14 |

OTHER PUBLICATIONS

"Office Action of Taiwan Counterpart Application", dated Mar. 30, 2021, p. 1-p. 8.

* cited by examiner

INTELLIGENT DISASTER PREVENTION SYSTEM AND INTELLIGENT DISASTER PREVENTION METHOD

CROSS-REFERENCE TO RELATED APPLICATION

This application claims the priority benefit of U.S. provisional application Ser. No. 62/813,763, filed on Mar. 5, 2019. The entirety of the above-mentioned patent application is hereby incorporated by reference herein and made a part of this specification.

BACKGROUND

Technical Field

The disclosure relates to an intelligent disaster prevention system and an intelligent disaster prevention method, and particularly relates to an intelligent disaster prevention system capable of updating refuge information in real-time and an intelligent disaster prevention method.

Description of Related Art

Existing traditional disaster prevention guidance training is to divide people into residential areas, and direct people to a destination via leading, broadcasting or directing at a specified time by designated personnel, and obtain feedbacks at the end by means of a physical questionnaire to optimize an evacuation procedure. However, when a disaster occurs, landforms and terrains may be changed to cause temporary traffic interruption, in this case, people cannot obtain effective evacuation routes and refuge information. Therefore, how to update the refuge information in real-time when disasters occur so that people may reach refuges more efficiently is a goal that those skilled in the art strive for.

SUMMARY

The disclosure is directed to an intelligent disaster prevention system and an intelligent disaster prevention method, which are adapted to update refuge information in real-time.

The disclosure provides an intelligent disaster prevention system including a server and an electronic device coupled to the server. The server detects the electronic device in a disaster area, and obtains location information of the electronic device. The server obtains real-time disaster information from a website. The server obtains a real-time aerial image corresponding to the disaster area. The server selects a first refuge from a plurality of refuges corresponding to the disaster area according to the location information, the real-time disaster information, and the real-time aerial image, and calculates an evacuation route from the location information to the first refuge. The electronic device receives the first refuge and the evacuation route and displays the first refuge and the evacuation route on a map.

The disclosure provides an intelligent disaster prevention method including following steps. A server is used to detect an electronic device in a disaster area, and obtain location information of the electronic device. The server is used to obtain real-time disaster information from a website. The server is used to obtain a real-time aerial image corresponding to the disaster area. The server is used to select a first refuge from a plurality of refuges corresponding to the disaster area according to the location information, the real-time disaster information, and the real-time aerial image, and calculate an evacuation route from the location information to the first refuge. The electronic device is used to receive the first refuge and the evacuation route and display the first refuge and the evacuation route on a map.

Based on the above description, in the intelligent disaster prevention system and the intelligent disaster prevention method, the server is used to detect the location information of the electronic device of the user in the disaster area. The server obtains the real-time disaster information and the real-time aerial image when the disaster occurs, and selects the refuge according to the location information of the user, the real-time disaster information, and the real-time aerial image, and transmits the refuge and an evacuation route for arriving to the refuge to the electronic device of the user.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
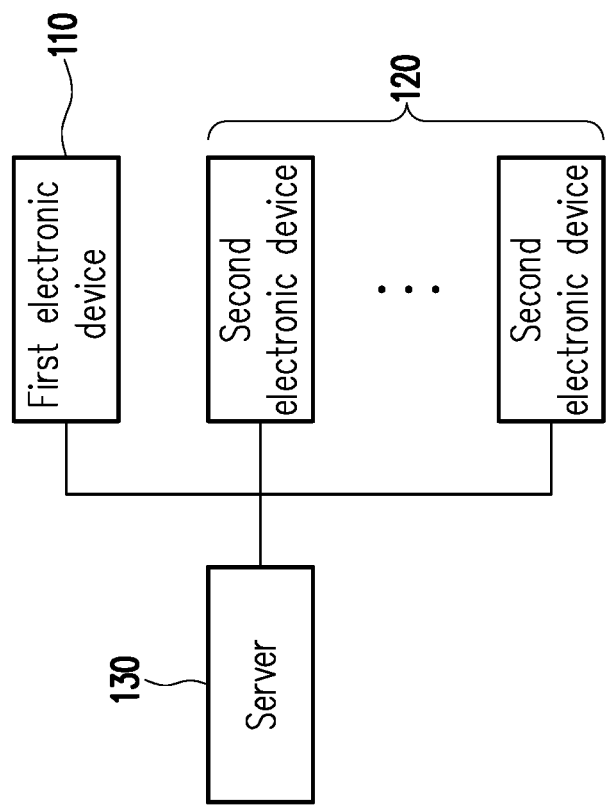
FIG. 1 is a block diagram of an intelligent disaster prevention system according to an embodiment of the disclosure.

FIG. 1 is a block diagram of an intelligent disaster prevention system according to an embodiment of the disclosure.

Referring to FIG. 1, an intelligent disaster prevention system 100 of the disclosure includes a first electronic device 110, a plurality of second electronic devices 120 and a server 130. The first electronic device 110 and the second electronic devices 120 are coupled to the server 130 through a wireless network. The first electronic device 110 and the second electronic devices 120 are, for example, smart phones, tablet computers, smart watches, head-mounted devices, augmented reality (AR) devices, virtual reality (VR) devices, mixed reality (MR) devices, or other similar user devices. The server 130 is, for example, an intelligent disaster prevention system server. In an embodiment, the server 130 may include a disaster prevention background system and communicate with a "refuge creation application" and a "disaster prevention guidance application" executed by the first electronic device 110 and the second electronic devices 120. The disaster prevention background system may include a refuge database and provide refuges and evacuation routes to users based on user locations and other real-time disaster information. The "refuge creation application" provides the users with information such as locations, photos, names, descriptions, priority levels, etc., of the created refuges and displays the refuges on a map. The "disaster prevention guidance application" may provide functions such as self-disaster prevention training, disaster prevention knowledge learning (for example, understanding of disasters, correct evacuation methods, confirmation of surrounding refuges, etc.), real-time refuge guidance in case of disaster occurrence, etc. Information such as a user identification code, a time record, a route record, whether the destination is arrived, a feedback, an abnormality report, etc., generated during the self-disaster prevention training of the user may be reported to the server 130. When a disaster occurs, the server 130 may display appropriate refuges on the map according to habits of each person in the self-disaster prevention training.

In an embodiment, the server 130 detects the first electronic device 110 in a disaster area and obtains location information of the first electronic device 110. The server 130 obtains real-time disaster information from a website. The server 130 obtains a real-time aerial image corresponding to the disaster area. The real-time aerial image may include an aerial camera image, a satellite image, and a closed circuit television (CCTV) image. The server 130 selects a first refuge from a plurality of refuges corresponding to the disaster area according to the location information, the real-time disaster information, and the real-time aerial image, and calculates an evacuation route from the location information to the first refuge. The electronic device 110 receives the first refuge and the evacuation route and displays the first refuge and the evacuation route on a map. In order to prevent the user from getting lost due to tension, the first electronic device 110 may provide navigation for reaching the first refuge on the map according to the evacuation route, and instruct the user when to make turning in, for example, a voice-activated manner. The first refuge and the evacuation route may also be displayed on the map of the first electronic device 110 through augmented reality, virtual reality, or mixed reality.

To be specific, a crawling artificial intelligence module of the server 130 may extract real-time disaster information such as information of an official disaster warning system, specific public website information, information from civil society network service platforms, etc., in real-time when disasters occur or disaster occurrence is simulated, and optimize or update the evacuation route based on the location information of the user and the real-time disaster information. The server 130 extracts a plurality of keywords from the real-time disaster information, and updates the first refuge and the evacuation route according to the keywords. For example, the server 130 may search for paragraphs including keywords of refuge and disaster, obtain segmented words in the paragraphs by using a natural semantic segmentation method, and perform deep learning on the keywords and the segmented words by using a natural semantic understanding method. The server 130 may obtain information such as a degree of overcrowding of the refuge and a degree of damage to the refuge according to the real-time disaster information and make a relevant score on the refuge.

On the other hand, when the multiple keywords in the real-time disaster information correspond to the evacuation route, and the server 130 determines that the evacuation route is interrupted according to the multiple keywords, the server 130 calculates another evacuation route from the location information to the first refuge or selects a second refuge from the multiple refuges, and calculates a second evacuation route from the location information to the second refuge. For example, when the server 130 obtains a public news segment "the 52 km section of the highway 11 is interrupted in both directions due to rock fall caused by heavy rain" from the real-time disaster information, the server 130 may obtain keywords of "highway 11", "52 km", "interruption in both directions", etc., and update the evacuation route passing through the 52 km section of the highway 11 based on the above keywords. When the evacuation route is interrupted and the user cannot reach the first evacuation site, the server 130 may select a second refuge and transmit a second evacuation route corresponding to the second refuge to the user.

In an embodiment, the server 130 may continuously detect people in the real-time aerial image, calculate a crowd density and a crowd flow direction of the people according to the real-time aerial image, and update the evacuation route according to the crowd density and the crowd flow direction. To be specific, the server 130 may identify feature points of the real-time aerial image, and use a global positioning system and the feature points of the real-time aerial image to match an actual map to achieve aerial image positioning. The server 130 may also use a deep learning model to identify passersby from the real-time aerial image to implement crowd density analysis and crowd flow direction analysis, and calculate an optimal evacuation route for each user based on real-time crowd information and refuge information. Moreover, when a disaster occurs, the server 130 may also instruct a plurality of aerial cameras to take a plurality of aerial images corresponding to the disaster area and build a three-dimensional real-time model of the disaster area based on the multiple aerial images, so as to improve correctness and a confidence value of real-time route planning and disaster guidance.

Figure 2:
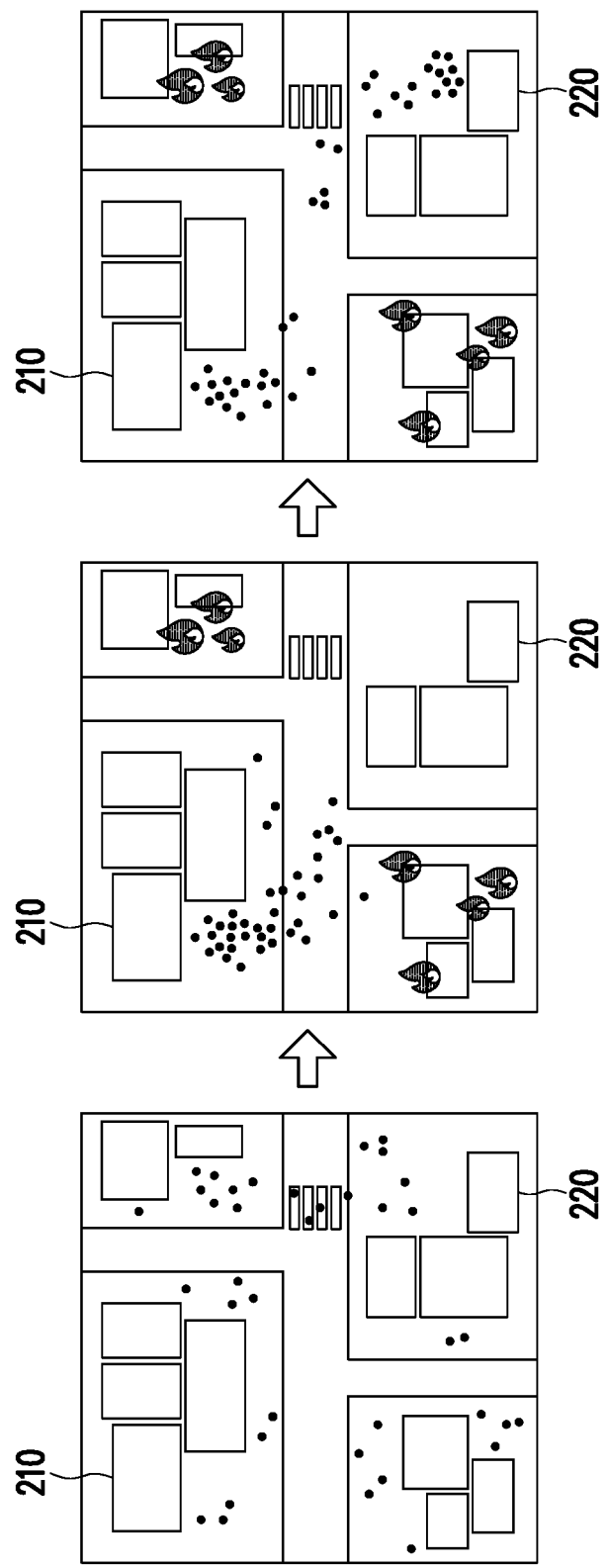
FIG. 2 is a schematic diagram of updating an evacuation route according to an embodiment of the disclosure.

FIG. 2 is a schematic diagram of updating an evacuation route according to an embodiment of the disclosure.

Referring to FIG. 1 and FIG. 2, the multiple refuges may include a first refuge 210 and a second refuge 220 adjacent to the first refuge 210, and the location information of the second electronic devices 120 (i.e. the users holding the second electronic devices 120) is adjacent to the first refuge 210 and the second refuge 220. When the server 130 detects that the second electronic devices 120 with a quantity greater than a predetermined percentage are moving toward the first refuge 210 through a real-time aerial image (i.e., a crowd density of people moving toward the first refuge 210 is far greater than a crowd density of people moving toward the second refuge 220), the server 130 updates the first refuge 210 of a part of the second electronic devices 120 to the second refuge 220, and updates the second evacuation route corresponding to the second refuge 220. On the other hand, the server 130 may also update the evacuation route according to the location information of the second electronic device 120. For example, when the server 130 determines that distances between a part of the second electronic devices 120 and the first refuge 210 are greater than distances between the other second electronic devices 120 and the first refuge 210, the server 130 may transmit evacuation route update information to the above-mentioned part of the second electronic devices 120 that are farther from the first refuge 210 to instruct a part of the users to go to the second refuge 220 with less crowds.

Figure 3:
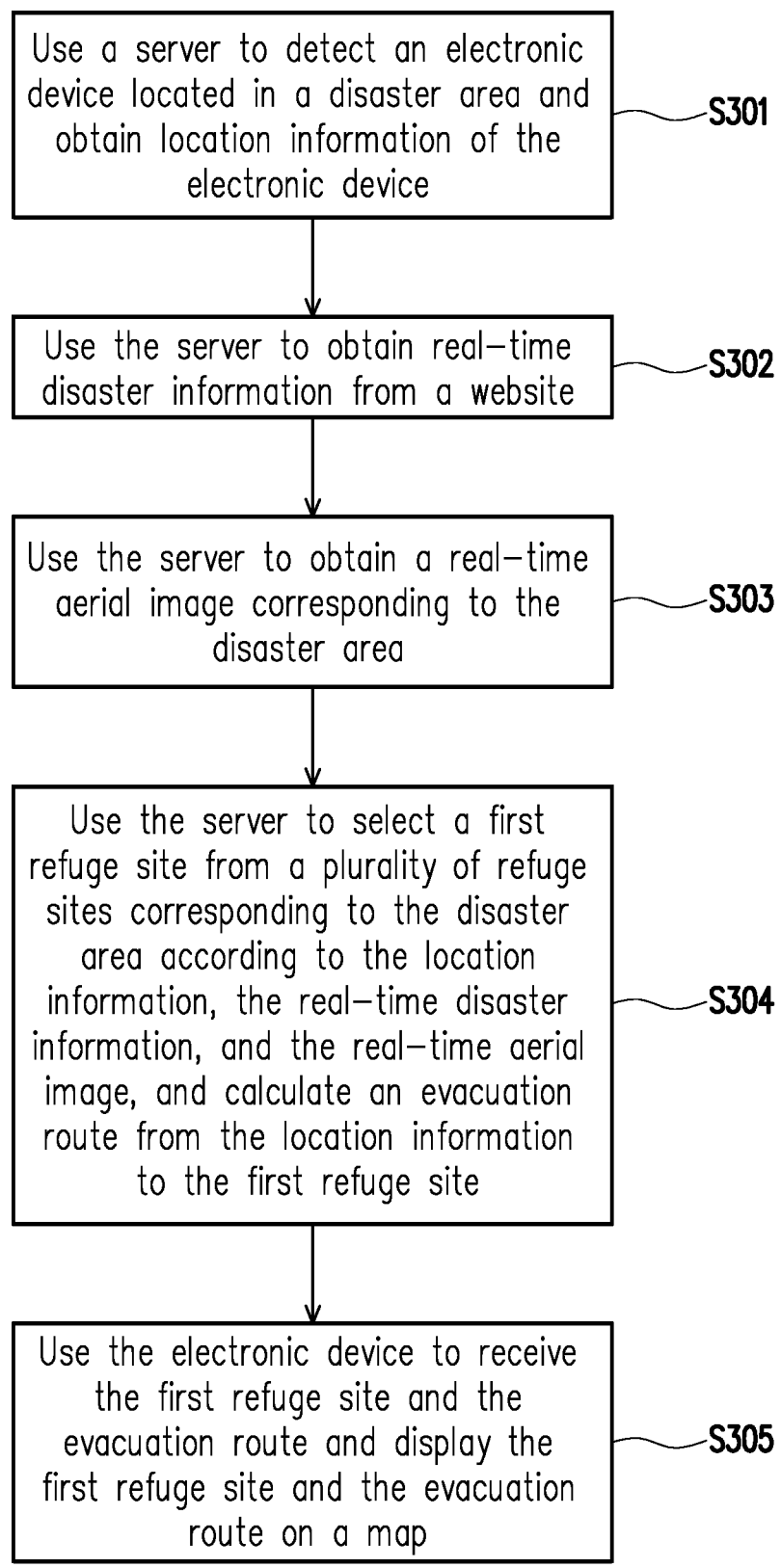
FIG. 3 is a flowchart illustrating an intelligent disaster prevention method according to an embodiment of the disclosure.

FIG. 3 is a flowchart illustrating an intelligent disaster prevention method according to an embodiment of the disclosure.

Referring to FIG. 3, in a step S301, a server is used to detect an electronic device in a disaster area, and obtain location information of the electronic device.

In a step S302, the server is used to obtain real-time disaster information from a website.

In a step S303, the server is used to obtain a real-time aerial image corresponding to the disaster area.

In a step S304, the server is used to select a first refuge from a plurality of refuges corresponding to the disaster area according to the location information, the real-time disaster information, and the real-time aerial image, and calculate an evacuation route from the location information to the first refuge.

In a step S305, the electronic device is used to receive the first refuge and the evacuation route and display the first refuge and the evacuation route on a map.

In summary, in the intelligent disaster prevention system and the intelligent disaster prevention method, the server is used to detect the location information of the electronic device of the user in the disaster area. The server obtains the real-time disaster information and the real-time aerial image when the disaster occurs, and selects the refuge according to the location information of the user, the real-time disaster information, and the real-time aerial image, and transmits the refuge and the evacuation route for arriving to the refuge to the electronic device of the user.

It will be apparent to those skilled in the art that various modifications and variations can be made to the disclosed embodiments without departing from the scope or spirit of the disclosure. In view of the foregoing, it is intended that the disclosure covers modifications and variations provided they fall within the scope of the following claims and their equivalents.

What is claimed is:

1. An intelligent disaster prevention system, comprising:
a server; and
an electronic device, coupled to the server, wherein
the server detects the electronic device in a disaster area, and obtains a location information of the electronic device;
the server obtains a real-time disaster information from a website;
the server obtains a real-time aerial image corresponding to the disaster area, wherein the real-time aerial image comprises people in the disaster area;
the server selects a first refuge from a plurality of refuges corresponding to the disaster area according to the location information, the real-time disaster information, and the real-time aerial image, and calculates an evacuation route from the location information to the first refuge; and
the electronic device receives the first refuge and the evacuation route, and displays the first refuge and the evacuation route on a map,
wherein the server continuously detects the people in the real-time aerial image, calculates a crowd density and a crowd flow direction of the people according to the real-time aerial image, and updates the evacuation route according to the crowd density and the crowd flow direction.

2. The intelligent disaster prevention system as claimed in claim 1, wherein the server extracts a plurality of keywords from the real-time disaster information and updates the first refuge and the evacuation route according to the keywords.

3. The intelligent disaster prevention system as claimed in claim 2, wherein when the keywords correspond to the evacuation route and the server determines that the evacuation route is interrupted according to the keywords, the server calculates another evacuation route from the location information to the first refuge or selects a second refuge from the refuges, and calculates a second evacuation route from the location information to the second refuge.

4. The intelligent disaster prevention system as claimed in claim 1, further comprising a plurality of second electronic devices coupled to the server, wherein the refuges comprise a second refuge adjacent to the first refuge, the location information of the second electronic devices is adjacent to the first refuge and the second refuge, and when the server detects that the second electronic devices with a quantity greater than a predetermined percentage are moving toward the first refuge, the server updates the first refuge of a part of the second electronic devices to the second refuge and updates a second evacuation route corresponding to the second refuge.

5. The intelligent disaster prevention system as claimed in claim 4, wherein distances between a part of the second electronic devices and the first refuge are greater than distances between other second electronic devices other than the part of the second electronic devices and the first refuge.

6. The intelligent disaster prevention system as claimed in claim 1, wherein the real-time aerial image comprises an aerial camera image, a satellite image, and a closed circuit television image.

7. The intelligent disaster prevention system as claimed in claim 1, wherein when a disaster occurs, the server instructs a plurality of aerial cameras to take a plurality of aerial images corresponding to the disaster area and builds a three-dimensional real-time model of the disaster area based on the aerial images.

8. The intelligent disaster prevention system as claimed in claim 1, wherein the first refuge and the evacuation route are displayed on the map of the electronic device using augmented reality, virtual reality, or mixed reality.

9. The intelligent disaster prevention system as claimed in claim 8, wherein the electronic device provides navigation for reaching the first refuge according to the evacuation route.

10. An intelligent disaster prevention method, comprising:
using a server to detect an electronic device in a disaster area and obtain a location information of the electronic device;
using the server to obtain a real-time disaster information from a website;
using the server to obtain a real-time aerial image corresponding to the disaster area, wherein the real-time aerial image comprises people in the disaster area;
using the server to select a first refuge from a plurality of refuges corresponding to the disaster area according to the location information, the real-time disaster information, and the real-time aerial image, and calculate an evacuation route from the location information to the first refuge; and
using the electronic device to receive the first refuge and the evacuation route, and display the first refuge and the evacuation route on a map,
wherein the server continuously detects the people in the real-time aerial image, calculates a crowd density and a crowd flow direction of the people according to the real-time aerial image, and updates the evacuation route according to the crowd density and the crowd flow direction.

11. The intelligent disaster prevention method as claimed in claim 10, wherein the server extracts a plurality of keywords from the real-time disaster information and updates the first refuge and the evacuation route according to the keywords.

12. The intelligent disaster prevention method as claimed in claim 11, wherein when the keywords correspond to the evacuation route and the server determines that the evacuation route is interrupted according to the keywords, the server calculates another evacuation route from the location information to the first refuge or selects a second refuge from the refuges, and calculates a second evacuation route from the location information to the second refuge.

13. The intelligent disaster prevention method as claimed in claim 10, wherein the refuges comprise a second refuge adjacent to the first refuge, the location information of a plurality of second electronic devices is adjacent to the first refuge and the second refuge, and when the server detects that the second electronic devices with a quantity greater than a predetermined percentage are moving toward the first refuge, the server updates the first refuge of a part of the second electronic devices to the second refuge and updates a second evacuation route corresponding to the second refuge.

14. The intelligent disaster prevention method as claimed in claim 13, wherein distances between a part of the second electronic devices and the first refuge are greater than distances between other second electronic devices other than the part of the second electronic devices and the first refuge.

15. The intelligent disaster prevention method as claimed in claim 10, wherein the real-time aerial image comprises an aerial camera image, a satellite image, and a closed circuit television image.

16. The intelligent disaster prevention method as claimed in claim 10, wherein when a disaster occurs, the server instructs a plurality of aerial cameras to take a plurality of aerial images corresponding to the disaster area and builds a three-dimensional real-time model of the disaster area based on the aerial images.

17. The intelligent disaster prevention method as claimed in claim 10, wherein the first refuge and the evacuation route are displayed on the map of the electronic device using augmented reality, virtual reality, or mixed reality.

18. The intelligent disaster prevention method as claimed in claim 17, wherein the electronic device provides navigation for reaching the first refuge according to the evacuation route.

\* \* \* \* \*